(12) United States Patent
Ren et al.

(10) Patent No.: US 8,818,826 B2
(45) Date of Patent: *Aug. 26, 2014

(54) INSURANCE CLAIM ASSOCIATION METHOD AND APPARATUS

(71) Applicant: Guidewire Software, Inc., Foster City, CA (US)

(72) Inventors: Sandia Ren, San Francisco, CA (US); Allen Morano, Milpitas, CA (US); Jeremy Shawn Henrickson, San Francisco, CA (US); James Michael Burton, San Francisco, CA (US)

(73) Assignee: Guidewire Software, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/869,879

(22) Filed: Apr. 24, 2013

(65) Prior Publication Data
US 2013/0238369 A1 Sep. 12, 2013

Related U.S. Application Data

(63) Continuation of application No. 11/086,889, filed on Mar. 22, 2005, now Pat. No. 8,447,631.

(51) Int. Cl.
*G06Q 40/00* (2012.01)
*G06Q 40/08* (2012.01)
*G06Q 10/10* (2012.01)

(52) U.S. Cl.
CPC .............. *G06Q 40/08* (2013.01); *G06Q 10/10* (2013.01)
USPC .......................................................... 705/4

(58) Field of Classification Search
USPC ............................................................ 705/4
See application file for complete search history.

(56) References Cited

U.S. PATENT DOCUMENTS

2002/0035488 A1* 3/2002 Aquila et al. ................ 705/4
2004/0225535 A1* 11/2004 Bond et al. .................. 705/4

* cited by examiner

*Primary Examiner* — Thomas M Hammond, III
(74) *Attorney, Agent, or Firm* — Van Pelt, Yi & James LLP

(57) ABSTRACT

A computer-based insurance claim processing system (500) provides for the formation and segregated storage of associations (510) that link various active insurance claims (506) to one another. In addition, if desired, the associations can comprise additional information regarding, for example, the nature or type of association and/or other information as a user may wish to include to inform, control, or otherwise characterize the association and/or the associated claims.

30 Claims, 4 Drawing Sheets

INSURANCE CLAIM ASSOCIATION METHOD AND APPARATUS

CROSS REFERENCE TO OTHER APPLICATIONS

This application is a continuation of co-pending U.S. patent application Ser. No. 11/086,889, entitled INSURANCE CLAIM ASSOCIATION METHOD AND APPARATUS, filed Mar. 22, 2005, which is incorporated herein by reference for all purposes.

TECHNICAL FIELD

This invention relates generally to insurance claims processing and more particularly to computer-based insurance claim processing systems.

BACKGROUND

When an insured party suffers an insured event (i.e., a loss) the insuring party must typically process a corresponding active insurance claim. This typically entails the creation of the claim, assignment of the claim to one or more entities to effect processing of the claim, a gathering of relevant facts, coverage analysis, and the making of a claim payment to or on behalf of the insured party, to name but a few of the more important defining activities. It is typically in the interests of all concerned that such processing occur in as rapid a manner as possible, thus rendering the insured whole with as little delay as possible while also reducing overhead requirements and corresponding expense for the insuring party.

Computer-based insurance claim processing systems exist, at least in part, to address such needs. Many of these systems serve to provide centralized control and guidance with respect to initiating insurance claims, assigning various claims processing tasks, and effecting payments to the insured. At least some of these systems go further and provide additional services and capabilities. For example, it is known to leverage the capability of such a system to aid in automatically facilitating best practices across a large number of claims adjusters working tens of thousands of active claims.

Notwithstanding significant advances provided by computer-based insurance claim processing systems, some issues yet remain. There are times, for example, when a given insurance company might wish to handle a number of claims as a group. Such a need can arise in response to various circumstances. As one example, it may be helpful to commonly treat all claims as stem from a common insured event (such as damage to various parties owing to a single storm). As a different example, it may be helpful to commonly treat all claims as relate to a legal proceeding. As a third example, it may be helpful to commonly treat multiple claims that are related by shared financial transactions, as when a single large claim is split up into multiple claims that are to be paid from separate accounts. As a fourth example, it may be helpful to commonly treat multiple claims that arise from the same event, but which apply to different financial reporting periods.

There are also instances when the claims are not being formally handled as a group but where some relationship among them is nevertheless of interest. For example, one might link claims relating to similar accidents at a similar employer, even if one claim has already been settled and these claims are not necessarily the same "event"—they are, however, similar enough that an adjuster would want to look at the other claims as a valid point of reference.

Present attempts to address such a need essentially track pre-computer-based insurance claim processing system solutions; to establish such a group, the processing entity will annotate each and every claim to be grouped in some manner to thereby both identify and establish the group itself. This approach, however, presents numerous problems. It tends to be labor intensive and prone to error. Any given solution along these lines tends, ultimately, to be relatively inflexible in form and practice. This, in turn, often tends to stymie and/or inhibit use of the capability, thereby leaving the enterprise in much the same situation as prevailed prior to incorporating such an approach.

BRIEF DESCRIPTION OF THE DRAWINGS

The above needs are at least partially met through provision of the insurance claim association method and apparatus described in the following detailed description, particularly when studied in conjunction with the drawings, wherein:

FIG. 4 comprises an illustrative user interface screen shot as configured in accordance with various embodiments of the invention;

Figure 1:
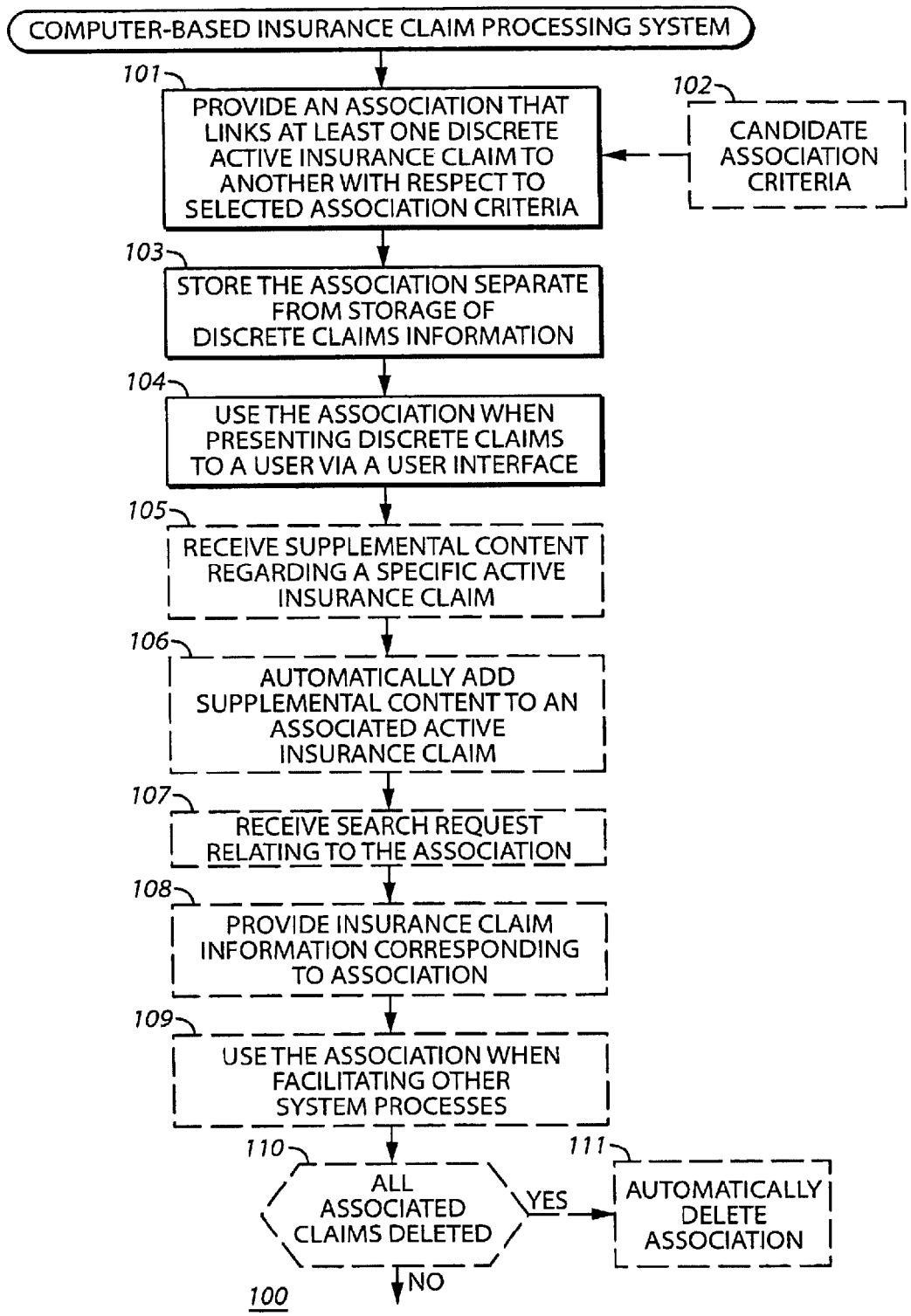
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, these various embodiments are suitable for deployment in conjunction with a computer-based insurance claim processing system having a plurality of discrete active insurance claims stored therein. Such a system will typically comprise a user interface that provides discrete access to selected discrete active insurance claims (for example, by providing information constituting elements of the claim on a display). Pursuant to a general approach in accordance with these teachings, one provides within that system an association that links at least a first one of the discrete active insurance claims to at least a second one of the discrete active insurance claims with respect to at least one selected association criteria. That association is stored separately, however, from information as corresponds to the discrete active insurance claims themselves. This association is then used when presenting selected ones of the associated discrete active insurance claims to a user via the user interface.

Depending upon the needs and/or wishes of a particular system developer, providing such an association can comprise an automatic event (using, for example, preselected association criteria as a creation and/or specification trigger and/or guide) and/or a user-driven event. As to the latter, an association creation opportunity can be provided to a user (via, in a preferred approach, the system's user interface) and association creation information received from the user then used to form the association itself.

The association itself can comprise, for example, a defining title and/or a characterization regarding a type of association. The association can also comprise, if desired, additional information. Such additional information, when available, can be employed in a wide variety of ways.

Such an association will support a number of useful opportunities. Examples include, but are certainly not limited to, using the association information to influence a manner by which associated claims are to be processed, using the association information as input to an automated rules-based portion of the computer-based insurance claim processing system, using the association information to identify financial information for associated claims that can then be used, for example, to calculate corresponding aggregate values representative of the group of associated claims, and/or using the association information to facilitate fraud detection and/or for settlement guidance (for example, by referring to similar claims or past claims with a same claimant).

So configured, active insurance claims are readily linked by one or more associations. Such associations can be defined at the time of creating a new active insurance claim or at some time subsequent to the creation of such claims. Association creation and management becomes relatively intuitive and simple to accomplish. This, in turn, permits and fosters use of the capability, which then aids in facilitating overall efficiency and effectiveness.

These and other benefits may become clearer upon making a thorough review and study of the following detailed description. Referring now to the drawings, and in particular to FIG. 1, these teachings are generally intended for application in conjunction with a computer-based insurance claim processing system having a plurality of discrete active insurance claims stored therein and further preferably having a user interface that facilitates providing discrete access to selected ones of the plurality of discrete active insurance claims. Such systems are general understood by those skilled in the art and, for the sake of brevity, further description regarding such systems will not be offered here except where otherwise pertinent to the description of these embodiments.

A preferred process 100 facilitates provision 101 of an association that links at least a first one of the plurality of discrete active insurance claims to at least a second one of the plurality of discrete active insurance claims with respect to at least one selected association criteria. This association criteria can and will vary considerably with the needs, requirements, and desires of a given system administrator and/or user base. Examples of association criteria include, but are certainly not limited to:
    a master/subordinate insurance claim relationship;
    a shared casualty event;
    a primary/excess payment amount;
    claims across multiple temporal reporting periods relating to a single loss event; and
    a shared insured entity;

to name but a few. If desired, the selected association criteria can optionally be selected from amongst a plurality of candidate association criteria 102 as may be provisioned with respect to a given system. Also if desired, association criteria creation capability can be provided to permit a given user or administrator to dynamically define and/or specify new or modified association criteria on the fly.

This step of providing an association can comprise an automated process if desired. A particular association can be automatically provided based, for example, upon at least one preselected association criteria. To illustrate, a given system could be configured to automatically associate all active insurance claims having a loss location within a given geographic location (such as a given street, shared postal code, a given sovereignty (such as but not limited to a municipality, county, state or province, country, or the like), continent, or the like).

Figure 2:
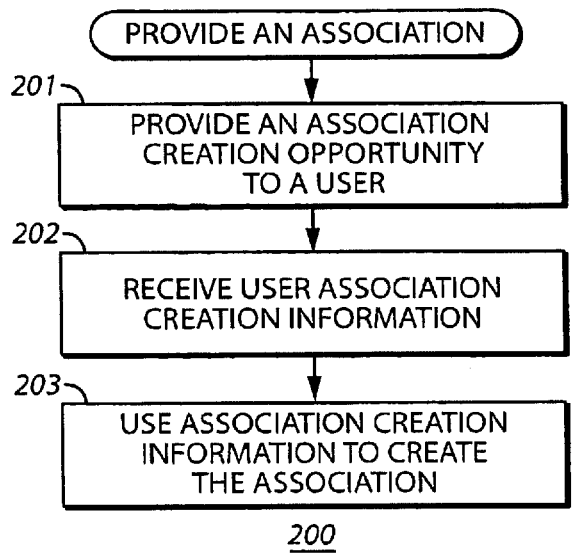
FIG. 2 comprises a flow diagram as configured in accordance with various embodiments of the invention.

This step of providing an association can also comprise a user-driven process if desired. To illustrate, and referring momentarily to FIG. 2, a given enabling process 200 can provide 201 an association creation opportunity to a user via a given system user interface (such as, for example, a browser-based user interface as will be noted further herein). This process 200 can then support receiving 202 association creation information from the user via that user interface and using 203 that association creation information to form a corresponding association.

Returning again to FIG. 1, regardless of whether one creates the association using an automated or user-driven process, the association itself can be comprised of, at a minimum, links to the associated active insurance claims. When the storage context comprises a relational database, those links can comprise pointers to the table entries for those discretely and separately stored active insurance claims. In the alternative, or in addition to such an approach, the contents of each individual active insurance claim can be modified to include a similar pointer back to the association itself. As yet another alternative, the linking information can be separately defined and stored separate from both the claims and other association information.

The association can comprise other information as may be useful or otherwise desired in a given setting. As one example, the association can have a name (which name, when provided, will preferably be at least somewhat descriptive with respect to the nature of the basis of the association itself).

As another example, the association can be provided with a characterization regarding a type of association as applies to the association. For example, if associations are being used within the system both for claims related by litigation and claims related by geographic region, the association type could be used to indicate which kind of association is being used to associate a given set of claims. The association type, when accommodated, can be automatically provided or again can be facilitated via user-based input. As to the latter, a user can be presented (via, for example, the user interface) with an opportunity to enter the characterization information (by, for example, creating the characterization information and/or by selecting a particular characterization type from a presented list of available candidate types). Upon receiving an entered characterization selection from a user, a compliant system can then use that entered characterization as the characterization for the corresponding association.

Figure 3:
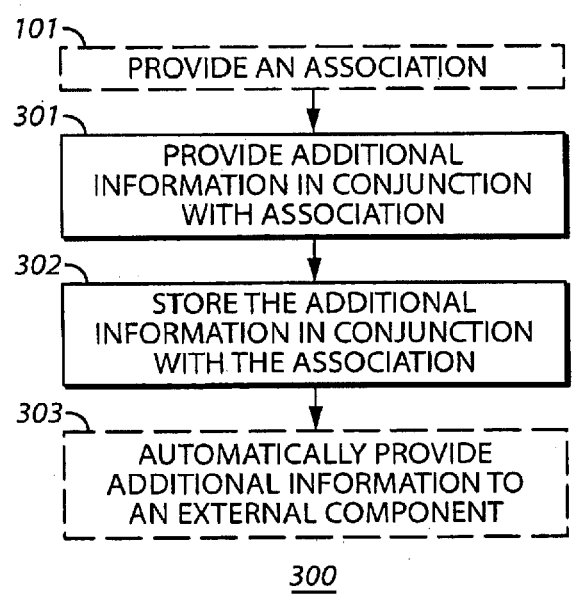
FIG. 3 comprises a flow diagram as configured in accordance with various embodiments of the invention.

If desired, a given association can also optionally comprise other information. To illustrate, and referring momentarily to FIG. 3, an optional process 300, subsequent to providing 101 an association as suggested above, can facilitate the provision 301 of additional information as corresponds to the provided association. This can comprise, for example, collecting the additional information from a user upon (or subsequent to) establishment of the association itself. The additional information can comprise any of a wide variety of metric values and/or text entries as may aid a given system operator with respect to efficient and effective insurance claims management. This additional information can comprise particular information regarding certain pertinent specifics pertaining to the association. A non-exhaustive listing of illustrative examples might include:

- specifics regarding a shared point of factual pertinence such as, for example, information regarding a particular type of asbestos as forms the basis of associating the insurance claims;
- specifics regarding a shared legal context (such as a given lawsuit, regulatory enforcement action, or the like);
- a sequence number as corresponds to the association (counting, for example, associations created within the system during some temporal window of interest);
- specifics regarding financial transactions (such as a financial limit to be applied to payments made against claims within the association);
- accounting or other categorization information to be used when analyzing data related to the association (such as an accounting code to be supplied to accounting systems for use in aggregating payments made against claims within the association);
- temporal information (such as dates of specific events relevant to claims within the association).

Upon being so provided, such additional information is preferably stored 302 in conjunction with the association information and therefore comprises a part of the association as versus the individual discrete active insurance claims that are linked to the association. This, in turn, permits retrieval and/or usage of the additional information in common and as appropriate during later usage of the association itself as described below. Other possibilities also exist as will be understood by those skilled in the art.

As but one illustrative example, this process 300 can optionally facilitate the automatic provision 303 of at least a portion of such additional information to an external component of choice. For example, presuming an enterprise architecture that integrates the computer-based insurance claims processing system with a downstream financials system (such as an accounts payable system or a general ledger system), certain additional information can be automatically sent to the financials system to facilitate the appropriate functioning of the latter. As a simple illustrative example, the additional information can comprise a code number (relating, for example, the association to a particular category of loss such as an asbestos claim). This code number can be automatically provided to a downstream financials system that associates that code number with payments and/or other reports to thereby facilitate the ease by which subsequent tracking can be effected.

Figure 4:
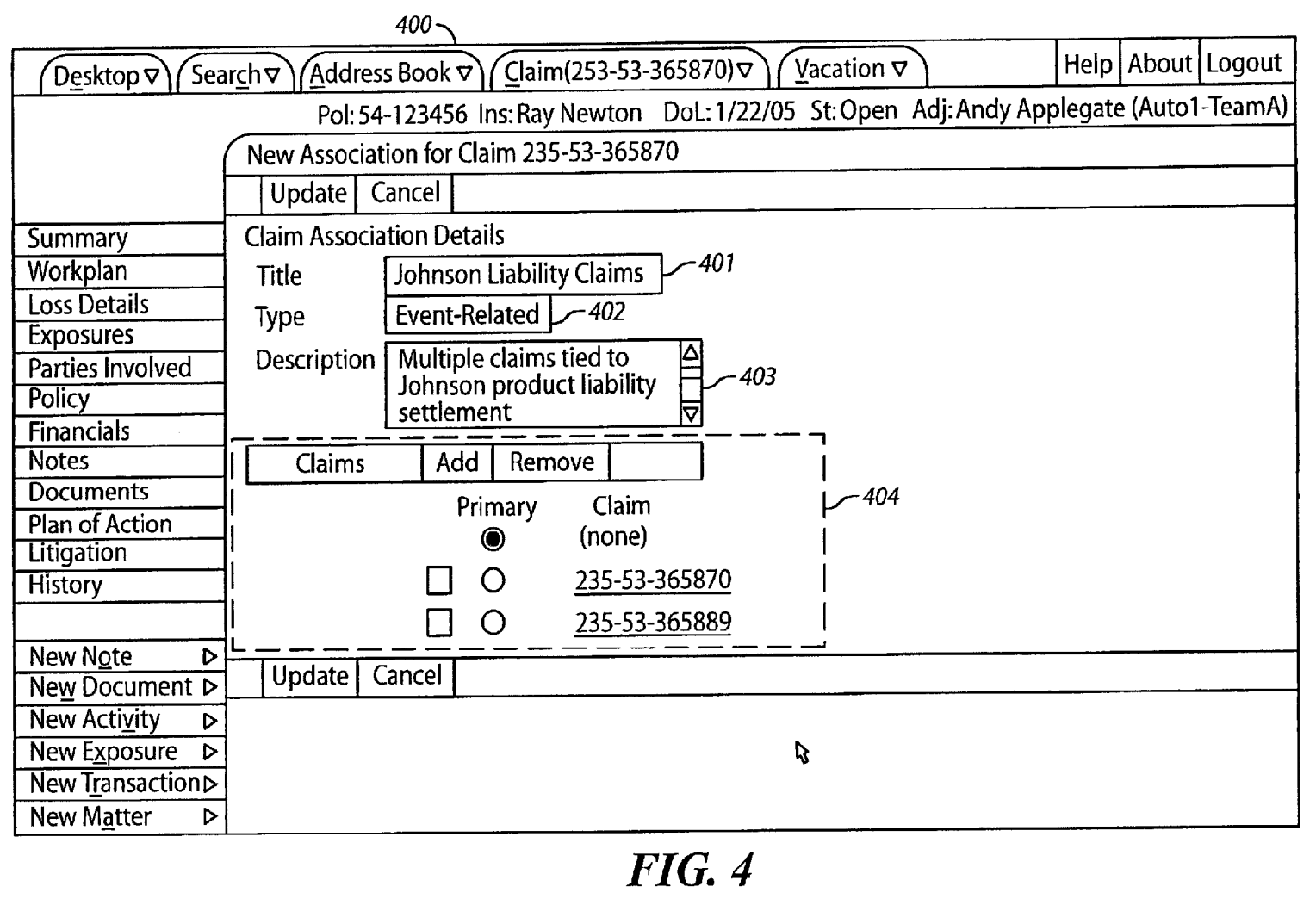

As mentioned above, the user interface can comprise, in a preferred approach, a browser-based interface. Such interfaces, though constantly developing and expanding with respect to supported capabilities and features, comprise a well-understood area of endeavor and require no further elaboration here regarding their general construct and nature. Referring momentarily to FIG. 4, however, an illustrative example of a given browser-based interface 400 will be provided to present a preferred approach to facilitating the association creation mechanism described above.

In this illustrative example, the interface 400 provides an association creation opportunity in conjunction with a specific discrete active insurance claim (denoted here as "Claim (235-53-365870)"). In this example, the association creation opportunity permits a user to enter or edit an association title 401. In this example the title field 401 comprises a free text field having a limited number of permissible characters. If desired, of course, other data entry paradigms as are known in the art or hereafter-developed can be employed instead. This illustrative embodiment also permits selection of an association type 402 as described above. In this example, the association type 402 is selected by a user from a list of candidate permissible types (using a pop-up submenu of candidate choices (not shown) to present such options in accordance with well-understood prior art technique in this regard). If desired, this can comprise a free text entry field or, as another alternative, a type creation opportunity can be provided to the user (either as a selectable option on the page shown or as a nested opportunity in the pop-up submenu).

This embodiment further provides a "Description" field 403 where a user can enter additional information regarding the association as described above. In this embodiment this additional information point of entry comprises a free text entry field. This permits a user to enter essentially any anecdotal information of interest and value. If desired, of course, preselected entry information can be provided, either to supplement a free text entry capability or in lieu thereof.

In this example, the association creation opportunity is shown in conjunction with a display that relates, or stems from, a specific discrete active insurance claim (i.e., "Claim 235-53-365870"). Associations serve, as described above, to associate and link one discrete claim to another (or to others). This association creation opportunity therefore also provides a claim association selection opportunity 404. Only two associated claims (i.e., 235-53-365879 and 235-53-365889) are shown in this example for the sake of clarity and simplicity, but it will be understood that essentially any number of associated claims can be so accommodated. This portion of the interface serves, in this illustrative embodiment, to allow a user to add additional claims to the association or to remove currently associated claims from the association. In this embodiment, the user also has the opportunity to designate one or more active claims as a "primary" or master claim to thereby reflect a master/subordinate claim relationship as employed by some insurance companies when managing their claims processing workload.

Note that this depiction shows how the association can be created directly from the view of one of the active claims, thereby illustrating the ease and convenience of creating and maintaining associations in this way.

So configured, a user can readily effect the creation of a useful and relevant association as per these teachings. Using a browser-based interface provides further advantage in that such interfaces are familiar to many users and thereby leverage the cumulative experience and skill a given user may already possess with respect to the navigation and usage of such an interface.

Referring again to FIG. 1, this process 100 then provides for storing 103 the provided association separately from the storage of information as corresponds to the discrete active insurance claims. This separateness can be physical if desired (for example, through the use of separate discrete memory platforms) but at least comprises a logical partitioning (where, for example, the claim and association information may share a common memory platform but are stored in a logically segregated fashion). Pursuant to one approach such information is stored in a relational database table in accordance with well-understood prior art technique.

Created and stored, the association is then used 104 when presenting information from and regarding discrete active insurance claims to a user (preferably via the above-mentioned user interface). This usage can and will vary with the needs of a given application setting. Illustrative examples include, but are not limited to, presenting information regarding one or more associated active insurance claims in combination with a presently presented insurance claim (for example, by displaying completion status, assigned appraisers, proposed settlement payouts, and so forth) and/or by presenting one or more user-assertable links that lead directly to information regarding such associated insurance claims (for example, a simple list of associated claims can be presented when viewing a given specific claim, and by clicking on one of those listed associated claims a user can be automatically taken to a detail page providing in-depth content regarding that linked claim.

Other possibilities exist as well. For example, these teachings are applicable in settings where a user provides supplemental content regarding an active insurance claim that has been associated with at least one other active insurance claim. To illustrate, and still referring to FIG. 1, upon receiving 105 supplemental content regarding a specific active insurance claim from a user (via, for example, the user interface mentioned above), this process 100 can then further provide for automatically adding 106 that supplemental content to another specific active insurance claim that is associated with the specific active insurance claim by the earlier formed association. This, in turn, makes the supplemental content available to the user when accessing that associated insurance claim.

The supplemental content can and will vary with the needs and requirements of a given application setting. Illustrative examples of supplemental content comprise, but are not limited to, specifications regarding an activity to be accomplished with respect to processing the corresponding active insurance claim, a user note regarding the specific active insurance claim, a document or uncompleted form, and so forth.

Such supplemental content can be automatically added in this manner in various ways. For example, by one approach, the supplemental content can be automatically stored in common with the associated active insurance claim. So configured, upon recalling that associated active insurance claim, the supplemental content as originally entered with respect to the earlier mentioned specific active insurance claim will be available for display at the same time. By another approach, if desired, the supplemental information can be retained in common with the original insurance claim but recalled for displaying with other associated insurance claim information upon recalling the latter for display. Those skilled in the art will likely recognize or be otherwise able to devise other compliant mechanisms and approaches as well.

As yet another illustrative example, supplemental information from an associated master insurance claim can be automatically provided for display when displaying information regarding an associated subordinate insurance claim as though the former formed a part of a presently displayed subordinate insurance claim.

By one optional approach, this process 100 can also comprise receiving 107 from a user via the user interface a search request as specifically relates to the association and the provision 108 of search request information regarding one or more active insurance claims as correspond to the association (or associations) as comprises a pertinent response to the search request. As yet another optional approach, this process 100 can support using 109 such an association in other ways when facilitating other system processes. For example, the information contained in an association can be used to influence, at least in part, a manner by which a given discrete active insurance claim as is linked to the association is to be processed (for example, an associated active insurance claim may be subject to a required special authorization before payments are allowed when that active insurance claim is associated with a particular identified loss event).

As yet another example, information in an association can be used as input to an automated rules-based portion of the computer-based insurance claim processing system. And as yet a further example, association information can be used to identify financial information for each discrete active insurance claim as is linked to the association, which financial information is then used to calculate one or more aggregate values of interest (as may relate to, for example, total reserves, total aggregate payments, and so forth for the associated claims).

As described, these processes are particularly suitable for use when supporting the processing active insurance claims. The point of processing a given claim, of course, is to eventually achieve closure of the claim as an active matter. If desired, and again as an optional step, upon detecting 110 that all insurance claims as correspond to a given association have been deleted (where "deleted" refers generally to concluding, closing, removing, or otherwise altering a claim's status from active to inactive status) the given association itself is automatically deleted 111. This avoids building up an inventory of associations that have outgrown their specific applicability and value.

So configured, a large volume of discrete active insurance claims as are inventoried and managed using a computer-based insurance claim processing system can be usefully linked to one another via an association process. The described associations comprise a highly flexible approach and readily accommodate a wide variety of user preferences and application paradigms. The creation, usage, and/or termination of such associations can be highly automated and/or rendered subject to specific user input and control. These associations permit relatively simple links to be created between claims while also readily accommodating a wealth of other kinds of association information and characterizing data. The resultant associations, which are readily integratable into many existing systems with little or no change being required with respect to the underlying active insurance claim data storage architecture, can be used to greatly facilitate the ease by which a given user can be provided with access to helpful and/or critical or controlling information as pertains, ultimately, to correctly and quickly processing a given active insurance claim.

Those skilled in the art will further appreciate that these teachings facilitate permitting a given active insurance claim to be a part of multiple associations or none at all. Users are able to navigate, in a preferred approach, between associated claims in a convenient and intuitive manner. Furthermore, in a preferred approach as described, it will be appreciated that a system administrator, user, or other interested party can readily add or extract information of various kinds and in various ways as regards the claims themselves and their linking associations.

Figure 5:
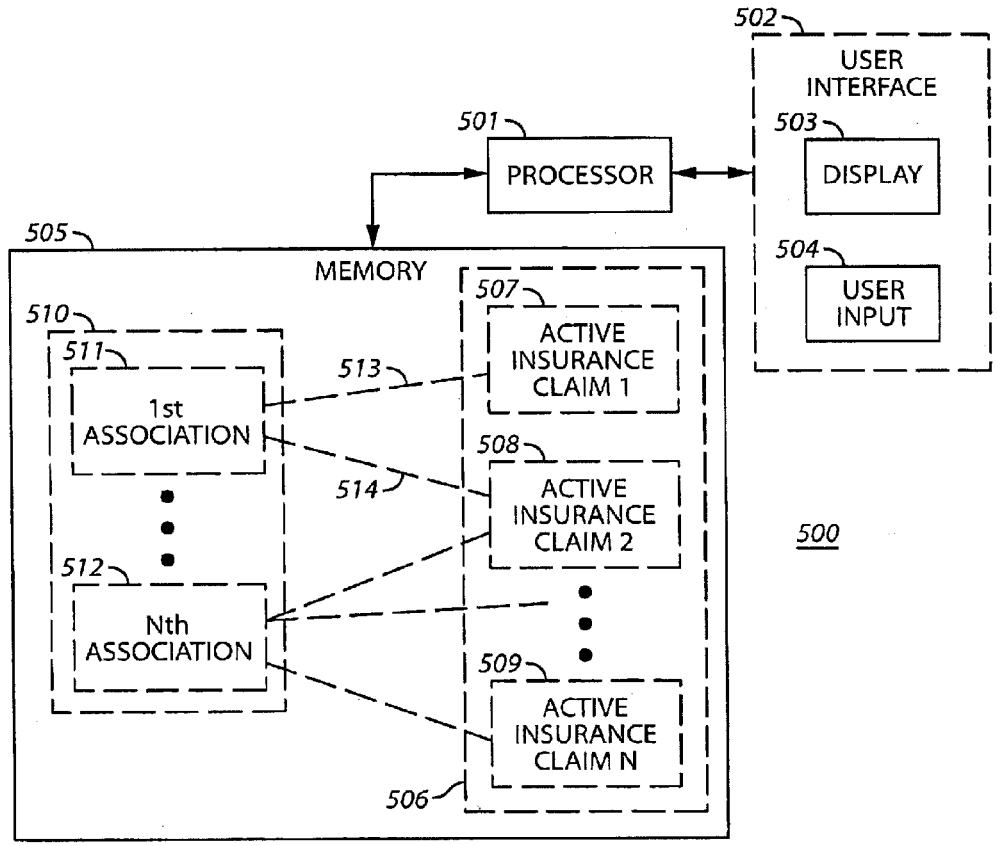
FIG. 5 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 5, an illustrative approach to such a platform will now be provided. FIG. 5 generally depicts pertinent portions of an apparatus 500 comprising a computer-based insurance claim processing system. This apparatus 500 includes generally a processor 501 (such as one or more central or distributed processing platforms) that operably couples to a user interface 502 (comprising, for example, a user display 503 and a user input 504 such as a keyboard and cursor control interface of choice (it will be understood by those skilled in the art that a typical commercially viable offering will comprise a large number of user interfaces to accommodate parallel usage by a large number of users; only one such user interface is shown here for purposes of clarity and simplicity)) and a memory 505.

Figure 6:
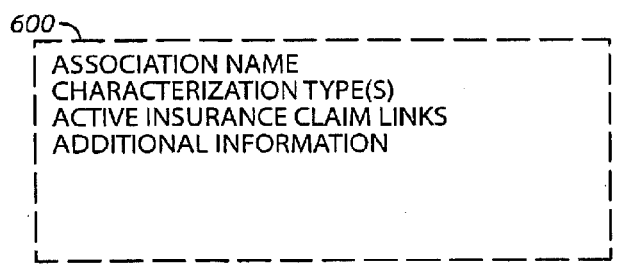
FIG. 6 comprises a data object schematic as configured in accordance with various embodiments of the invention.

The memory 505 can comprise a single storage platform or can comprise a distributed memory. Such architectural choices are well understood in the art and require no additional elaboration here. In this embodiment, the memory 505 is partitioned, at least logically, to comprise a plurality of discrete active insurance claims 506 and a plurality of associations 510 that link various claims to one another. To illustrate, as depicted, a first association 511 associates a first active insurance claim 507 to a second active insurance claim 508 via corresponding links 513 and 514. Meantime, another association (denoted here as being an Nth association 512 to underscore that any number of associations can be accommodated by these teachings) serves to link the second active insurance claim 508 with other claims including an Nth active insurance claim 509. Making reference to FIG. 6, these associations 600 can essentially comprise, in a preferred approach, an association name (i.e., a title), a characterization type (or types), links to associated active insurance claims, and such additional information as may suit the needs of a given application.

In such an apparatus 500, the processor 501 is preferably programmed to use such associations as described above when presenting selected active insurance claims to a user via the user interface 502. This can comprise, for example, providing an association creation opportunity to a user via the user interface 502, receiving association creation information from the user via the user interface 502, using that association creation information to form a new (or modify an existing) association that links at least one of the stored active insurance claims to another such claim, and storing that new association in the memory 505. This can also comprise, for example, receiving from a user via the user interface 502 supplemental content regarding a specific discrete active insurance claim, and automatically adding that supplemental content to another discrete active insurance claim that is associated with the first by a shared association such that the supplemental content becomes available to a user when accessing the another discrete active insurance claim.

So configured, and referring again to FIG. 5, such an apparatus 500 will readily support the segregated storage of associations that serve to link various active insurance claims in various ways to thereby serve various purposes as described above. Again, those skilled in the art will recognize and understand that other platform approaches may also be taken with similar benefits to be expected.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

The invention claimed is:

1. A method for use with a computer-based insurance claim processing system having a plurality of discrete active insurance claims stored therein, the method comprising:

receiving, via a user interface of the computer-based insurance claim processing system, a first association criteria from a user;

linking a first subset of the plurality of discrete active insurance claims, stored in a database of the computer-based insurance claim processing system, based on the first association criteria, wherein a first association is linked with the first subset of the plurality of discrete active insurance claims;

storing, in a memory, the first association criteria, wherein the memory is in a separate location from the storage of information that corresponds to the discrete active insurance claims;

storing, in the memory, first additional information relating to the first association criteria, wherein the first additional information characterizes a type of association corresponding to the first association criteria;

receiving, via the user interface of the computer-based insurance claim processing system, a second association criteria from the user;

linking a second subset of the plurality of discrete active insurance claims, stored in the database of the computer-based insurance claim processing system, based on the second association criteria, wherein a second association is linked with the second subset of the plurality of discrete active insurance claims;

storing, in the memory, the second association criteria;

storing, in the memory, second additional information relating to the second association criteria, wherein the second additional information characterizes a type of association corresponding to the second association criteria;

selecting, via the user interface, the first association or the second association; and presenting to the user, via the user interface, the corresponding subset of discrete active insurance claims associated with the selected association.

2. The method of claim 1 wherein the first association criteria comprises at least one of:

master and subordinate insurance claim relationship;

a shared casualty event;

a primary and excess payment amount relationship;

claims across multiple temporal reporting periods relating to a single loss event; and a shared insured entity.

3. The method of claim 1 wherein storing the first association criteria comprises storing information regarding the first association in a relational database table.

4. The method of claim 1 further comprises presenting information regarding associated insurance claims in combination with a presently presented insurance claim, wherein presenting information regarding associated insurance claims in combination with a presently presented insurance claim further comprises providing a user-assertable link that leads directly to information regarding one of the associated insurance claims.

5. The method of claim 1 further comprises presenting information regarding associated insurance claims in combination with a presently presented insurance claim, wherein presenting information regarding associated insurance claims in combination with a presently presented insurance claim further comprises displaying information from an associated master insurance claim as if it formed part of a presently displayed subordinate insurance claim.

6. The method of claim 1 further comprising:
upon determining that all insurance claims as correspond to a given association have been deleted, automatically deleting the given association.

7. The method of claim 1 further comprising:
receiving from a user via the user interface supplemental content regarding a specific active insurance claim; and
automatically adding the supplemental content to another specific active insurance claim that is associated with the specific active insurance claim by that association such that the supplemental content is available to a user via the user interface when accessing an associated insurance claim.

8. The method of claim 1 further comprising:
receiving from a user via the user interface supplemental content regarding a specific active insurance claim; and
automatically adding the supplemental content to another specific active insurance claim that is associated with the specific active insurance claim by that association such that the supplemental content is available to a user via the user interface when accessing an associated insurance claim,
wherein automatically adding the supplemental content to another specific active insurance claim comprises storing the supplemental content in common with a discrete active insurance claim as corresponds to the specific active insurance claim.

9. The method of claim 1 further comprising:
receiving from a user via the user interface supplemental content regarding a specific active insurance claim; and
automatically adding the supplemental content to another specific active insurance claim that is associated with the specific active insurance claim by that association such that the supplemental content is available to a user via the user interface when accessing an associated insurance claim,
wherein automatically adding the supplemental content to another specific active insurance claim comprises displaying at least a portion of the supplemental content in common with discrete active insurance claim information as corresponds to the specific active insurance claim.

10. The method of claim 1 further comprising:
receiving from a user via the user interface supplemental content regarding a specific active insurance claim; and
automatically adding the supplemental content to another specific active insurance claim that is associated with the specific active insurance claim by that association such that the supplemental content is available to a user via the user interface when accessing an associated insurance claim,
wherein the supplemental content comprises an activity to be accomplished with respect to processing the specific active insurance claim.

11. The method of claim 1 further comprising:
receiving from a user via the user interface supplemental content regarding a specific active insurance claim; and
automatically adding the supplemental content to another specific active insurance claim that is associated with the specific active insurance claim by that association such that the supplemental content is available to a user via the user interface when accessing an associated insurance claim,
wherein the supplemental content comprises a user note regarding the specific active insurance claim.

12. The method of claim 1 further comprising:
receiving from a user via the user interface supplemental content regarding a specific active insurance claim; and
automatically adding the supplemental content to another specific active insurance claim that is associated with the specific active insurance claim by that association such that the supplemental content is available to a user via the user interface when accessing an associated insurance claim,
wherein the supplemental content comprises a document.

13. The method of claim 1 wherein providing an association further comprises providing a characterization regarding a type of association.

14. The method of claim 1 wherein providing an association further comprises providing a characterization regarding a type of association, and wherein using the first association further comprises presenting the characterization to a user via the user interface.

15. The method of claim 1 wherein providing an association further comprises providing a characterization regarding a type of association, wherein using the first association further comprises presenting the characterization to a user via the user interface, and wherein providing a characterization regarding a type of association further comprises:
presenting to a user via the user interface an opportunity to enter the characterization;
receiving from the user an entered characterization; and
using the entered characterization as the characterization.

16. The method of claim 1 wherein providing an association further comprises providing a characterization regarding a type of association, wherein using the first association further comprises presenting the characterization to a user via the user interface, and wherein providing a characterization regarding a type of association further comprises:
presenting to a user via the user interface an opportunity to enter the characterization;
receiving from the user an entered characterization; and
using the entered characterization as the characterization,
wherein presenting to a user via the user interface an opportunity to enter the characterization further comprises presenting to the user a plurality of candidate characterizations.

17. The method of claim 1 further comprising:
receiving from a user via the user interface a search request as specifically relates to the first association; and
providing to the user in response to the search request information regarding active insurance claims as correspond to the first association.

18. The method of claim 1 wherein the user interface comprises a browser-based interface.

19. The method of claim 1 further comprising:
providing a first association further comprises providing additional information in conjunction with that association; and
storing the first association further comprises storing the additional information in conjunction with the first association.

20. The method of claim 1 further comprising:
providing a first association further comprises providing additional information in conjunction with that association; and
storing the first association further comprises storing the additional information in conjunction with the first association, wherein providing additional information in conjunction with that association further comprises collecting the additional information from a user upon establishing the first association.

21. The method of claim 1 further comprising:
providing a first association further comprises providing additional information in conjunction with that association; and
storing the first association further comprises storing the additional information in conjunction with the first association,
wherein providing additional information in conjunction with that association further comprises collecting the additional information from a user with respect to an already existing association.

22. The method of claim 1 further comprising:
providing additional information in conjunction with the first association criteria;
storing the first association criteria further comprises storing the additional information in conjunction with the first association; and
automatically providing at least a portion of the additional information to an external component.

23. The method of claim 1 further comprising using information contained in the first association to influence, at least in part, a manner by which a given discrete active insurance claim as is linked to the first association is to be processed.

24. The method of claim 1 further comprising:
using information contained in the first association as input to an automated rules-based portion of the computer-based insurance claim processing system.

25. The method of claim 1 further comprising:
using the first association criteria to identify financial information for each discrete active insurance claim as is linked to the first association criteria; and
using the financial information to calculate an aggregate value.

26. The method of claim 1 wherein the additional information relating to the first association comprises at least one of:
an association name;
a characterization;
a type of association;
a geographic region;
an information regarding a shared point of factual pertinence;
a shared legal context;
a sequence number;
financial transactions;
accounting information; and
temporal information.

27. An apparatus comprising a computer-based insurance claim processing system comprising:
a memory having discretely stored therein:
a plurality of discrete active insurance claims;
a user interface;
a processor operably coupled to the memory and to the user interface, wherein the processor is configured to:
receive, via the user interface of the computer-based insurance claim processing system, a first association criteria from a user;
link a first subset of the plurality of discrete active insurance claims, stored in a database of the computer-based insurance claim processing system, based on the first association criteria, wherein a first association is linked with the first subset of the plurality of discrete active insurance claims;
store, in the memory, the first association criteria, wherein the memory is in a separate location from the storage of information that corresponds to the discrete active insurance claims;
store, in the memory, first additional information relating to the first association criteria, wherein the first additional information characterizes a type of association corresponding to the first association criteria;
receive, via the user interface of the computer-based insurance claim processing system, a second association criteria from the user;
link a second subset of the plurality of discrete active insurance claims, stored in the database of the computer-based insurance claim processing system, based on the second association criteria, wherein a second association is linked with the second subset of the plurality of discrete active insurance claims;
store, in the memory, the second association criteria;
store, in the memory, second additional information relating to the second association criteria, wherein the second additional information characterizes a type of association corresponding to the second association criteria;
select, via the user interface, the first association or the second association; and
present to the user, via the user interface, the corresponding subset of discrete active insurance claims associated with the selected association.

28. The apparatus of claim 27 wherein the processor is further configured to:
receive from a user via the user interface supplemental content regarding a specific discrete active insurance claim; and
automatically add the supplemental content to another specific discrete active insurance claim that is associated with the specific discrete active insurance claim by the first association such that the supplemental content is available to a user via the user interface when accessing an associated insurance claim.

29. The apparatus of claim 27 wherein the first association further comprises at least one of:
a characterization regarding a type of association; and
additional information as corresponds to the association.

30. The apparatus of claim 27 wherein the additional information relating to the first association comprises at least one of:
an association name;
a characterization;
a type of association;
a geographic region;
an information regarding a shared point of factual pertinence;
a shared legal context;
a sequence number;
financial transactions;
accounting information; and
temporal information.

* * * * *